(12) United States Patent
Zamansky et al.

(10) Patent No.: US 9,372,895 B1
(45) Date of Patent: Jun. 21, 2016

(54) KEYWORD SEARCH METHOD USING VISUAL KEYWORD GROUPING INTERFACE

(71) Applicant: Rina Systems, Inc., Cincinnati, OH (US)

(72) Inventors: Leo Zamansky, Mason, OH (US); Yan Dai, Loveland, OH (US)

(73) Assignee: RINA SYSTEMS LLC, Cincinnati, OH (US)

( * ) Notice: Subject to any disclaimer, the term of this patent is extended or adjusted under 35 U.S.C. 154(b) by 0 days.

(21) Appl. No.: 14/043,398

(22) Filed: Oct. 1, 2013

Related U.S. Application Data (63) Continuation-in-part of application No. 13/608,715, filed on Sep. 10, 2012.

(51) Int. Cl.
*G06F 17/30* (2006.01)

(52) U.S. Cl.
CPC .................................. *G06F 17/3053* (2013.01)

(58) Field of Classification Search
USPC .................. 707/723, 727, 728, 729, 730, 732
See application file for complete search history.

(56) References Cited

U.S. PATENT DOCUMENTS

| | | | | |
|---|---|---|---|---|
| 7,089,236 B1* | 8/2006 | Stibel | ................... | G06F 17/3064 |
| 8,700,619 B2* | 4/2014 | Wiegering | ........ | G06F 17/30864 |
| | | | | 707/728 |
| 2002/0032693 A1* | 3/2002 | Chiou | .................. | G06F 17/3089 |
| | | | | 715/255 |
| 2007/0162431 A1* | 7/2007 | Yamada | ............. | G06F 17/30112 |
| 2007/0288433 A1* | 12/2007 | Gupta | ................. | G06F 17/3053 |
| 2010/0010959 A1* | 1/2010 | Broder | .............. | G06F 17/30672 |
| 2010/0077350 A1* | 3/2010 | Lim | ....................... | G06Q 10/107 |
| | | | | 715/810 |
| 2010/0114882 A1* | 5/2010 | Wiegering | ........ | G06F 17/30864 |
| | | | | 707/728 |
| 2010/0325111 A1* | 12/2010 | Aravamudan | ..... | G60F 17/30035 |
| | | | | 707/737 |
| 2013/0262418 A1* | 10/2013 | Bhasin | .............. | G06F 17/30082 |
| | | | | 707/694 |
| 2013/0318091 A1* | 11/2013 | Bhatia | ............... | G06F 17/30613 |
| | | | | 707/741 |
| 2014/0025480 A1* | 1/2014 | Carter | ................ | G06Q 30/0246 |
| | | | | 705/14.43 |

\* cited by examiner

*Primary Examiner* — Mohammad S Rostami
*Assistant Examiner* — Ahmed Abraham
(74) *Attorney, Agent, or Firm* — Ronald L. Rohde (57) ABSTRACT

A method of forming a keyword based search query that uses a plurality of keywords, in which the keywords of the query are arranged into groups of purpose-related keywords, in which each keyword is associated with a designation of its relative importance. The keywords of a group may be identified manually by the searcher, or existing keywords in a group may be used to suggest or automatically add additional related keywords to the group. The keywords of a group need not be semantically related, but only related to a common purpose of the keyword group. Additional keywords can be suggested to the searcher, or automatically added to the groups. Suitable additional keywords may be identified by reference to previous searches in which the existing keywords were grouped with those additional keywords. Keywords may also be derived from text designated by the searcher, using all or portions of one or more documents or text blocks that the user identifies as describing a concept of interest to the searcher. The searcher may also select sources to search and may designate the importance of sections of those sources.

27 Claims, 6 Drawing Sheets

KEYWORD SEARCH METHOD USING VISUAL KEYWORD GROUPING INTERFACE

TECHNICAL FIELD

This invention is generally related to methods for searching documents using keywords and keyword combinations.

BACKGROUND

The continued expansion of the Internet mandates an equal expansion of systems for searching for desired content on the Internet. Search engine sites have become portals through which most users find the content they seek; however, the technology behind search engines remains ineffective in presenting relevant results and connecting users from one relevant result to other relevant results.

The predominant method by which the Internet is searched is keyword-based. In the context of Internet searching, and as used in this application, a "keyword" comprises one or more words that are used as a search term. In the simplest model, a user provides a keyword or multiple keywords, and sites are ranked according to the number of uses of keywords, and results are delivered based on this ranking. Keywords in metatags may be treated as more important than keywords in other locations, and the rate at which pages are clicked by searchers using a keyword, may be a further basis for ranking pages.

Search engines have long sought a 'natural language' method for accepting queries from users, but this is fraught with difficulties, and most sophisticated searchers forego the use of natural language interfaces in favor of so-called 'advanced' search methods. For example, on Google, the advanced search options permit a user to identify required keywords, keywords that identify results to be excluded, groups of keywords, one of which must appear in a result, numbers in particular ranges, languages, regions, update dates, specific domains, locations of keywords, reading level of the page, file types, and usage rights. This 'advanced' method, however, can be difficult to understand and use effectively, and perhaps because of this the advanced search method is not readily and conspicuously offered to a searcher on Google.

It has been proposed to search for documents by identifying word clusters in a source document, and using these to search for similar occurrences in other documents, such as in U.S. Pat. No. 7,844,566, the entirety of which is incorporated by reference herein. This method, however, requires the searching computer to evidence a great deal of understanding of linguistic meaning and context, in order to properly identify the words from a source document to include in the searched word clusters and, in addition, evaluate whether the found results are or are not similar in subject to the source document. U.S. Pat. No. 7,769,771, the entirety of which is incorporated by reference herein, describes a method that uses a visual depiction of the relevance of documents and uses seed documents to create a search for additional documents.

Other keyword based search methods and computer systems for performing such methods are disclosed in U.S. Pat. Nos. 6,775,677, 5,926,812 and 5,857,179, each of which is incorporated by reference herein in its entirety.

U.S. patent application Ser. No. 13/608,715, filed Sep. 10, 2012 by the inventors of this application, and incorporated herein in its entirety, discloses a keyword based search methodology in which the user defines relative importance settings for each keyword, so that the user can change the relative importance of one keyword relative to at least one other keyword when the two keywords are used in conjunction as part of a query. The relative importance setting may be a numeric value such as an integer between 1 and 10 or 1 and 100, a fractional or floating or fixed precision decimal value, or may be a discrete variable having values selected from a set such as (low, medium, high). This method advantageously provides more discrete control over the way a search is performed than even the "advanced" search methods on Google and other search engines. However, even this method has the drawback that the user must define the keywords to be used, and may miss search results if concepts may be expressed in linguistic forms that do not use the chosen keywords.

Thus, despite the extensive development referenced above, there is a need for a searching method that permits intuitive management and targeting of specific keywords, in a way that can take advantage of human knowledge and understanding of words and context, yet remains intuitive to searchers.

SUMMARY

The forgoing limitations of the prior art are overcome according to the present invention, which provides, in one aspect, a search method in which a user query is defined by search keywords which include one or more groups of keywords having a common search purpose, the groups comprising purpose-related keywords, the groups combined with each other and with other individual keywords to form the query. "Purpose-related" in this context means that the keywords in the group are related to each other in that they have a common purpose for refining and ranking search results; purpose-related keywords may have a common semantic meaning or may have different semantic meanings but related conceptual purposes for the query.

According to the invention, the groups of purpose-related keywords are presented in a manner that visually distinguishes the keywords belonging to such a group from other individual keywords or keyword groups.

In disclosed embodiments, keywords may be derived from text selected by the searcher, where the text selected by the searcher originates from one or more documents or text blocks describing a concept of interest to the searcher. For example, in one embodiment, documents describing a concept of interest to the searcher are designated by the searcher from search results initially located using keywords supplied by the searcher. In this embodiment, the designated documents are used to develop new or additional keywords with which to search for additional search results. In a particular embodiment a word frequency analysis in the designated documents is used to identify the new or additional keywords.

In another disclosed embodiment, a block of text describing a concept of interest to the searcher is designated by the searcher, and the designated block of text is used to develop new or additional keywords or keyword groups with which to search for search results. In this embodiment as well, a word frequency analysis in the designated block of text is used to identify the new or additional keywords.

In any of the above embodiments, the keywords used in a search are presented to the searcher so that the searcher may define a relative importance setting as to each keyword to establish the relative importance of one keyword relative to at least one other keyword when the keywords are used in conjunction as part of a query. Further, the searcher may add keywords to a group, or delete keywords from a group which are not relevant.

In any of the above embodiments, the method may comprise adding additional keywords to a group, where the additional keywords are related to the existing keyword or keywords already in a group. The additional keywords may be provided by the searcher, may be suggested to the searcher, or the method may automatically include additional keywords. The additional keywords that are suggested or automatically included should be related to the same search purpose as the existing keywords. As one example, the additional keywords may be identified using a thesaurus or other index for identifying additional keywords that are semantically related to the existing keywords. In another example, the additional keywords may be identified from one or more previous searches, such as previous searches conducted by the same searcher, in which case additional keywords previously grouped with the existing keywords may be suggested or automatically grouped with the existing keywords. The searcher may also manually define purpose-related keywords to add to the group, rather than relying solely on suggestions.

The searcher may also define a relative importance setting as to each group relative to other groups, to be used to rank results found with the keywords. Relative importance settings may also be set for each keywords in a group so that they can be weighted relative to other keywords in the group.

In any of the embodiments disclosed, the searcher may prioritize the importance of defined fields of the documents being searched.

In the disclosed embodiments, the searcher may save a query that has been developed for later retrieval and re-use.

It is a further contemplated embodiment that a query developed according to the inventive method is delivered through an application service provider interface to one or more search engine at a remote location to generate query results, which are then reported to the user.

These and further aspects and embodiments of the invention will be better understood with reference to the attached drawings, in which:

DETAILED DESCRIPTION

As will be elaborated herein, the search methodology presented in this application enables the searcher to identify, manage and prioritize keywords, formulate keywords from text sources in addition to the searcher's own selections, iteratively refine the keywords using semantic references as well as text sources located by the searcher's query, and then enables the storage and retrieval of queries. The invention is implemented, for example, on a computer system comprising hardware and software including processors, communication infrastructure, memory and storage, such as is shown in FIG. 12 of the above-incorporated U.S. Pat. No. 7,844,566 and described in Section V thereof.

Figure 1:
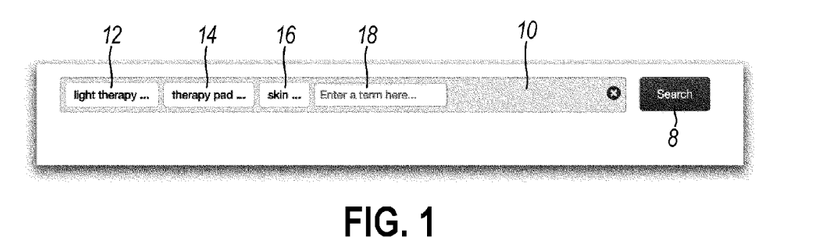
FIG. 1 illustrates a presentation of a keyword search query in accordance with the present invention, including three keyword groups.

Referring to FIG. 1, to formulate a query, a search window is displayed which includes a search bar 10 into which a user may type keywords such as "light therapy" 12, "therapy pad" 14 and "skin" 16. Each keyword typed in the text entry area 18 is converted to a keyword group which is presented as seen at 12, 14 and 16. Keywords may include one or more words; multi-word keywords may be designated as such by enclosing the multiple words in quotes when entered in the text entry area 18. Keywords may also be defined using a truncation operator (e.g., "*") typed at the end of a root portion of a keyword, or using an unknown character operator (e.g., "?") at any location in the keyword.

Figure 2:
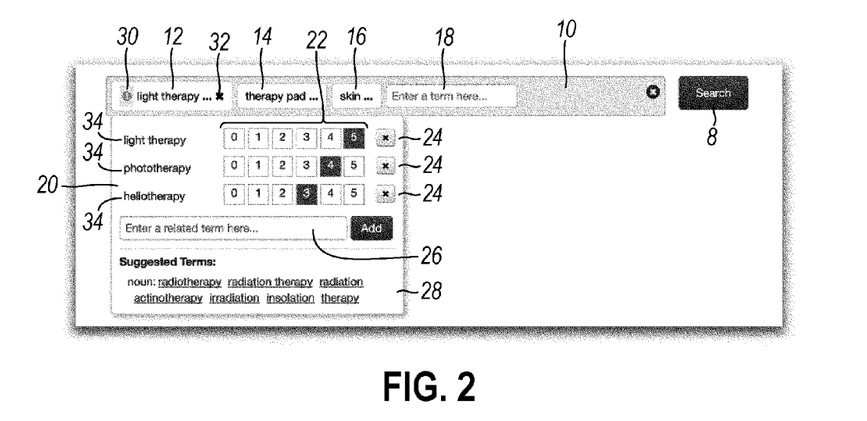
FIG. 2 illustrates the members of a keyword group in the search query of FIG. 1, showing the relative importance ascribed by the searcher to each keyword in the group.
Figure 3:
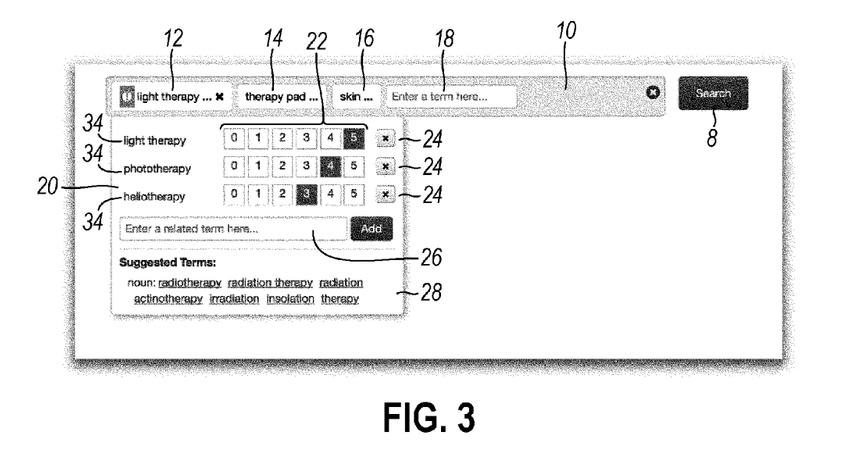
FIG. 3 illustrates the marking of a keyword group as critical to the query.

As seen in FIGS. 2 and 3, each keyword group, e.g., 12, 14 and 16, is associated with a set of controls 20 which can be accessed by clicking on the keyword. These controls include an importance control 22 attached to each keyword in the group. In the illustrated case the controls are a ranking of the importance of the keyword to the query, on a scale between 0 and 5, with larger numbers designating greater importance. The importance control 22 for each keyword in a group is initially set to a default value of 3 although other default values could be used. A weight of 0 means that a keyword is ignored in the search. A keyword may also be removed from the keyword group entirely by clicking a remove control 24 (iconically represented by an X). Notably, during the process of refining a search it may be preferable, when a keyword is believed to be irrelevant, to retain the keyword in the keyword group with a weight of 0 rather than delete it, so as to have a record of which keywords have been considered during the query refining process.

In this embodiment of the invention, the importance controls are associated in a one to one correspondence with the keywords in a group. Entering a keyword into a group automatically generates a control that sits adjacent to the entered keyword, and the keyword and control are deleted together. Other embodiments of the invention are possible, in which multiple keywords are associated with one control. In this case the weight applied to the several words is defined by the one associated control.

In alternative embodiments, the importance control can have more incremental settings, or fewer, and may be presented as a slider bar, dial, or any other control establishing a relative importance setting to each keyword. Also, lower numbers may be used to indicate greater importance rather than higher numbers. Furthermore, text or iconic characterizations of importance may be used in the place of numeric representations.

A keyword group in its simplest form comprises only one keyword shown in the search bar 10, and an associated control 22, and no related keywords. This is the initial condition of a keyword group when it is created by the entry of the keyword into the text area 18. However, a keyword group can be enhanced and made more effective by the addition of keywords having a purpose related to the existing keywords in the group. In one example, the additional keywords may be synonyms or conceptual equivalents to the keyword. In another example, the keywords may be purpose-related keywords which may have a very different meaning from the existing keywords but have the same purpose in the context of the search query. In the illustrated case of keyword group 12 for "light therapy", the keyword group includes "phototherapy", which is a synonym for "light therapy", and also additional keywords which have a similar purpose but not the same meaning. For example, the keywords illustrated in FIG. 3 further include "heliotherapy", which is a form of light therapy using sunlight, and thus is not identical in meaning to "light therapy" or "phototherapy"; "heliotherapy" is purpose-related to "light therapy" and "phototherapy", specifically, they have the common purpose of identifying light-related therapeutic methods.

Additional related keywords may be manually added to a group by entering them into a text entry area 26 and pressing the adjacent "Add" button; the entered keyword is then added to the list of related words in conjunction with controls in area 20.

To help the search create a query, the initially entered keyword and/or any subsequently entered related keywords may be used to look up suggested keywords, which are presented in an area 28. The searcher may select a suggested keyword by clicking on it, and in response the suggested keyword will be added in conjunction with a new importance control in area 20. Suggested keywords presented in area 28 are derived from the existing keywords that have already been selected and included in the group; thus, selection of a suggested keyword from area 28 typically will alter the remaining suggested keywords presented in area 28, which are chosen to have relevance to the newly added keyword as well as the previously added keyword. Suggested keywords may be derived from numerous sources. For example, existing keywords may be used with a thesaurus or other index of keywords to find keywords with similar meaning. Alternatively, or in addition, suggested keywords may be obtained from prior searches, by identifying prior searches in which the existing keywords were used, and suggesting any keywords which were grouped with the existing keywords in the prior search. Prior searches by the same searcher may be particularly useful to identify purpose-related keywords, as searchers may tend to construct searches with similar conceptual frameworks and may wish to re-use purpose-related groups of keywords from prior searches.

Each keyword in a group may be edited after entry. To change a keyword, the searcher may click on the text box 34 including the keyword, and type a replacement or revised keyword. For example, the searcher may click on "phototherapy" and replace the keyword with "phototherapy".

In addition to identifying the importance for each keyword in a group in the manner discussed above, the keyword group itself may be marked as 'critical' using a button control 30 (iconically designated with an exclamation mark "!"). Marking a keyword group as critical indicates that each search result must contain at least one of the related keywords in the keyword group marked 'critical.' A keyword group can also be deleted from the query in its entirety by the use of a delete button 32 (iconically designated with an "X"). The critical and delete controls 30 and 32 are available when a keyword group is selected and the controls window 20 is open for that keyword group.

The searcher may evaluate and enhance the settings for each keyword group in a query, in the manner described above, by opening the controls window 20 for each keyword group and then adjusting the settings. This process may begin with the first keyword group, and then sequentially through the others, or may be performed simultaneously on several keyword groups, in any order. The ordering of the keyword groups does not affect the search results as the keywords in all group are applied in a logical conjunction along with their respective weights (or criticality) to rank possible search results.

Figure 3A:
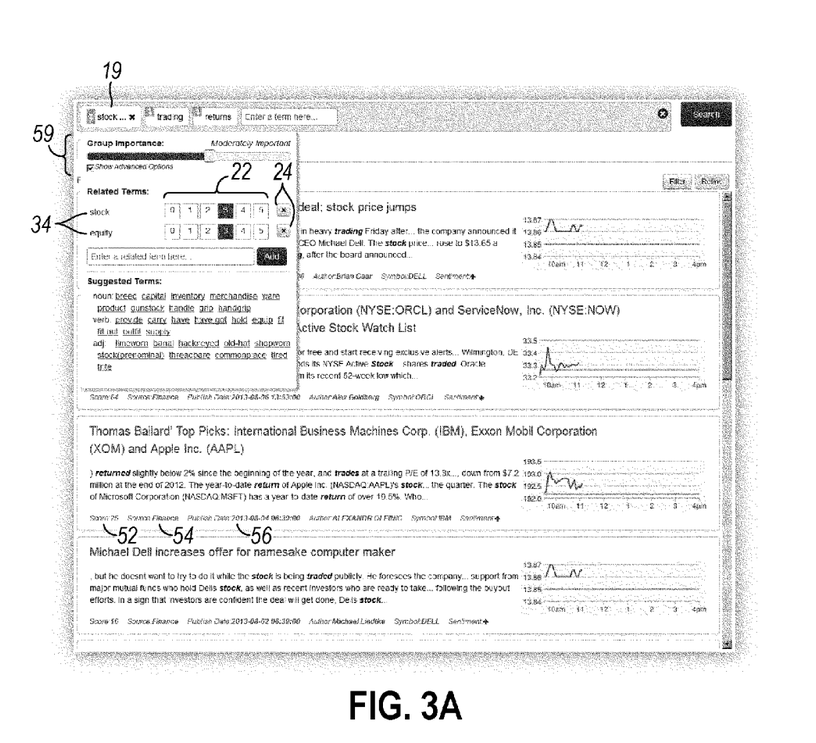
FIG. 3A illustrates an alternative set of controls usable with a keyword group to define the importance thereof.

Referring now to FIG. 3A, in an alternate embodiment, a group of keywords, such as the group associated with the keyword "stock" 19, may be associated with a "group importance" control such as shown at 59, which will be used in conjunction with the importance controls 22 for each keyword in the group to determine the relative importance of those keywords as compared to keywords in other groups. In a further alternate embodiment, individual importance controls such as 59 may be omitted and only a group importance control 59 may be provided.

Figure 4:
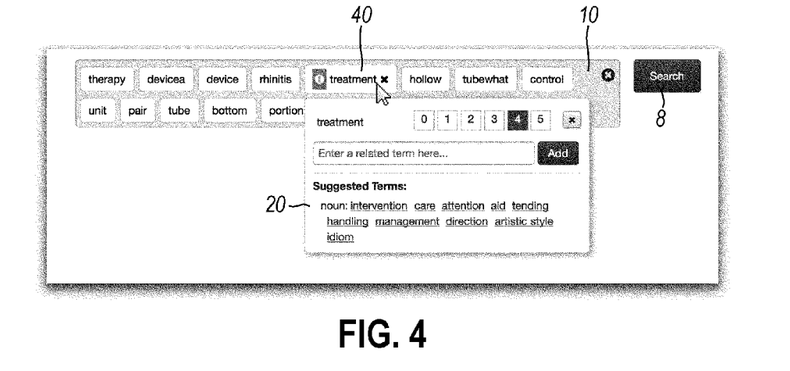
FIG. 4 illustrates a keyword search query developed in response to a block of text designated by the searcher, and the searcher's modification of the resulting query.

Referring now to FIG. 4, an alternative method for defining a search query begins with a searcher-designated block of text that relates to a concept of interest. To define a query from a block of text, the user selects the block of text from a document or search result, and copies the text to the clipboard. Thereafter, the searcher can initiate an 'Import Text' option (not shown), and paste the text into a text box. Groups of individual words in the pasted text may be converted to multi-word keywords by a suitable designation method, such as surrounding the individual words with quotes, or adding a '+' character between words, or other such methods. For example, 'rental property' (two words) in the pasted text could be changed to 'rental+property' (a two word keyword). Accepting the designated text, after any editing, converts the text into a search query which contains keyword groups, such as shown in FIG. 4, one for each keyword the designated text, excepting typical so-called "stop words" such as "a", "an" and "the".

As seen in FIG. 4, in a query formulated from searcher-designated text, each keyword group includes one keyword identified in the designated text, and the system assigns a calculated importance to the keyword which is based upon the frequency of appearance of the keyword in the designated text. In the illustrated case, keywords have been generated from text relating to rhinitis therapy using hollow tubing; in the keyword group created for the keyword "treatment" 40, that keyword has been initialized with a importance of "4". The searcher has clicked on the keyword group 40 and set it as critical, and can thereafter add related keywords to the keyword group, and select weights applied to each keyword in the group, and make other modifications using the controls discussed above. The searcher can perform these steps for each derived keyword group, and/or delete unnecessary keyword groups.

After a query has been developed according to the steps and methods described above, the searcher may click the 'Search' button 8, to test the effectiveness of the query. It is anticipated that the searcher may repeatedly modify and test a query, evaluating the search results generated to refine the query to deliver the best search result set.

Figure 5:
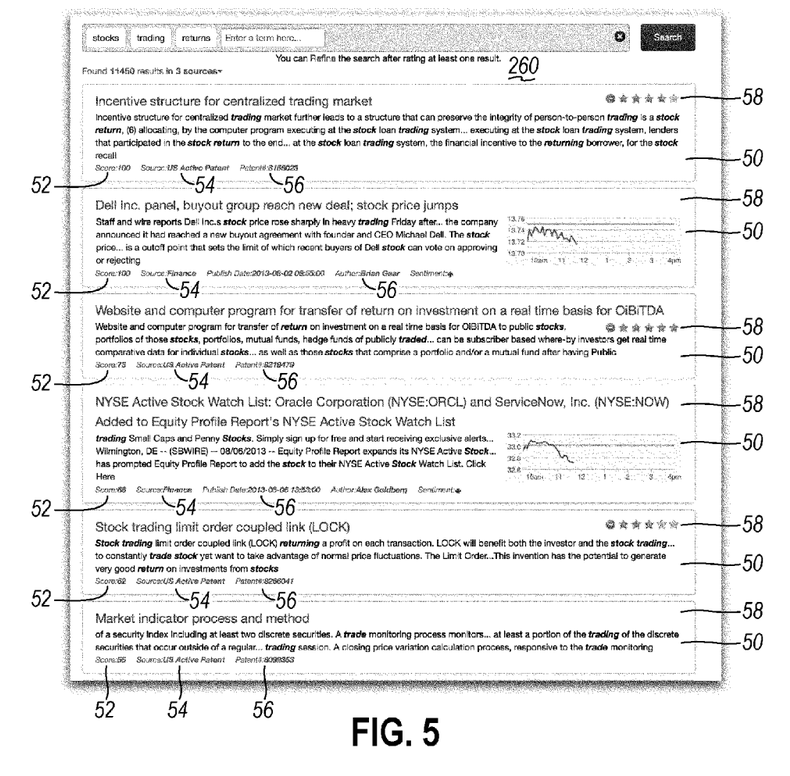
FIG. 5 illustrates a search results listing produced from a query, illustrating the process of rating results in order to produce a refined query.

Referring now to FIG. 5, search results 50 are presented in a list form, each result presented with a number of designations:

The Score designation 52 defines the perceived relevance of the search result out of a maximum possible score of 100. The score 52 indicates the extent to which the result satisfied the searcher's query. The higher the score, the more relevant the search result. Results are shown in order from most to least relevant according to score values. The Score values are normalized so that the top search result has a score of 100.

Source 54 specifies the source database from which the result was retrieved. As will be discussed below, documents may be searched from multiple data sources and the source of a result is identified with each result.

In addition, a citation designator 56 provides details on the result's citation. A patent result, for example, is designated by a patent number. A financial article is designated, as appropriate, by a stock symbol, a sentiment, a date published, an author, and the like. Other documents may be designated by file name, last modified, date, author, etc.

As a component of the intended refinement and redevelopment of search results, the searcher may use the quality of existing results to refine the query and search for additional results. This is done using a relevance control 58. After reviewing the search results, the searcher is able to rank the relevance of the results. In the illustrated embodiment, six levels are used to rank results: 'Not Relevant' (no stars), 'Slightly Relevant' (1 star), 'Moderately Relevant' (2 stars), 'Relevant' (3 stars), 'Very Relevant' (4 stars) and 'Completely Relevant' (5 stars). The searcher may also click a hide control (designated with a "-" icon) to remove a relevance ranking that has been erroneously created. After marking at least one of the results, the searcher can then refine the results by initiating a refinement function, e.g. by clicking the link 60 "You can Refine the search after rating at least one result" at the top of the result list, or pushing a button or invoking another control associated with the refinement function.

Figure 6A:
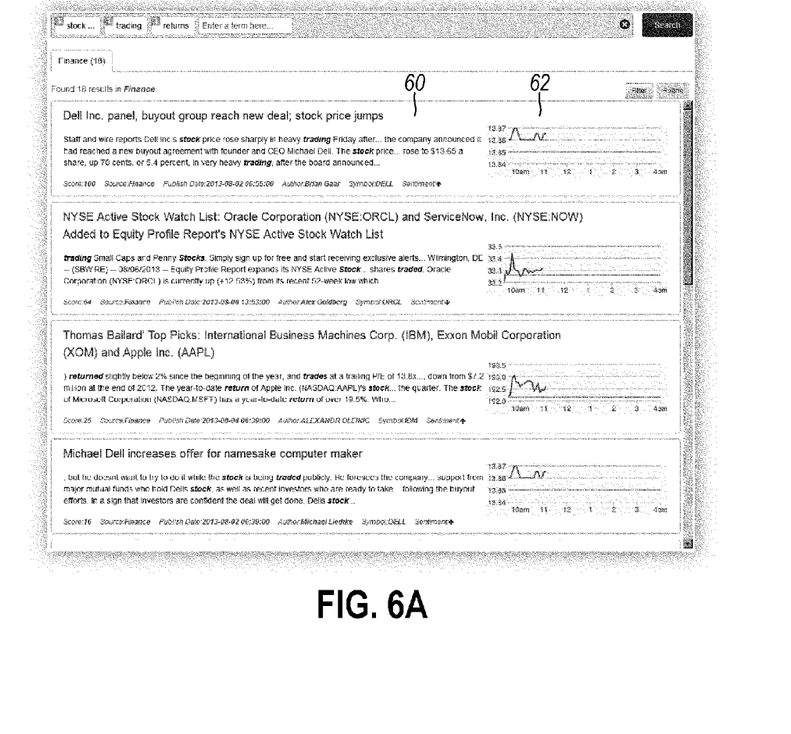
FIG. 6A illustrates the results list for a refined query developed from rating of the results shown in FIG. 5.

As seen in FIG. 6A, when the user has clicked the refinement prompt 60, a new query is constructed and run on the documents; the new query is constructed based on word frequencies of non-stop words in the documents that are designated as relevant, weighted according to the relevance rankings the searcher has assigned to those documents. As a result, the most relevant ranked documents will appear in the top of the new search, and other results which are akin to those most relevant documents will be ranked more highly than was the case prior to the refinement. A query defined through refinement in this manner can often identify results which would otherwise remain undiscovered, because the refinement process will identify one or several common keywords to relevant results which may be missed by the searcher's initial query.

FIG. 6A illustrates that content of the documents other than text may be used to enhance the presentation of results; for example, in addition to text from the result documents as seen at 60, graphical information of relevance (in this case, stock ticker history) can be presented as part of the search results as seen at 62. The style of presentation and the information presented is responsive to the type of document and the database from which it is retrieved.

Figure 6B:
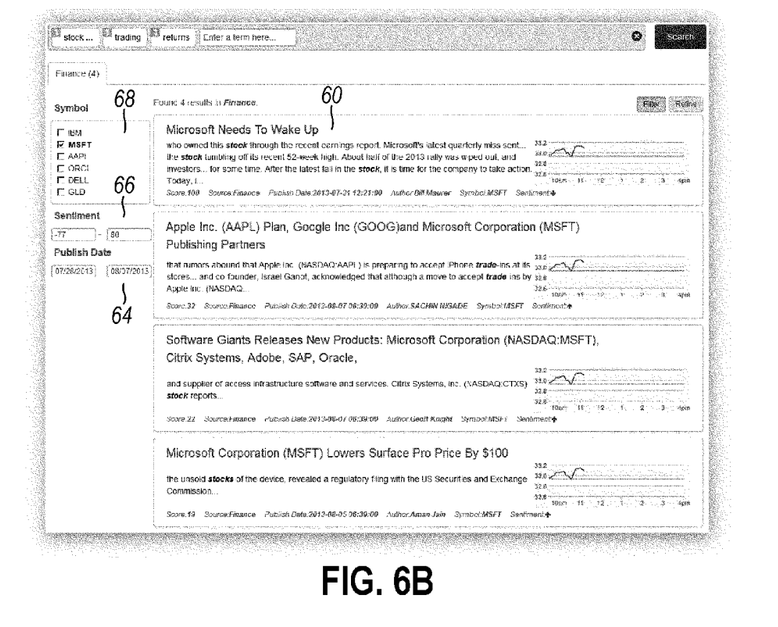
FIG. 6B illustrates filtering controls usable with the results list taking advantage of fields of the underlying data which may be used to filter results.

FIG. 6B illustrates a filtering function that may be used to enhance a search result list; specifically, where the documents included typed data in a specific field, that typed data may be retrieved and displayed with the results permitting filtering of the results according to the typed data. In the illustrated case the documents presented are associated in the document data with stock ticker symbols, and the symbols included in the result set are tabulated and presented in the area 68 with a checkbox next to each so that the user may limit the results to those that relate to a particular stock ticker symbol such as MSFT (Microsoft). In addition, the documents presented are associated with "sentiment" data stating whether a positive or negative outlook is expressed in the document, and this may be used for filtering by selecting a low and high sentiment value in area 66 to limit the presented results to those demonstrating a sentiment in the selected range. Finally, the documents are dated in the database, and in response to this data the user may enter a date range in area 64 to limit the results to those in a date range of interest.

It will be appreciated that other forms of typed data may be used to provide result filtering, not limited to stock ticker symbol, sentiment and date, and filters using other typed data can be presented in an analogous manner to that seen in FIG. 6B. Furthermore, it will be appreciated that the display and filtering functions shown in FIGS. 6A and 6B are applicable to results presented in response to any type of query, whether created by the user or generated from text, or both of these.

Figure 7:
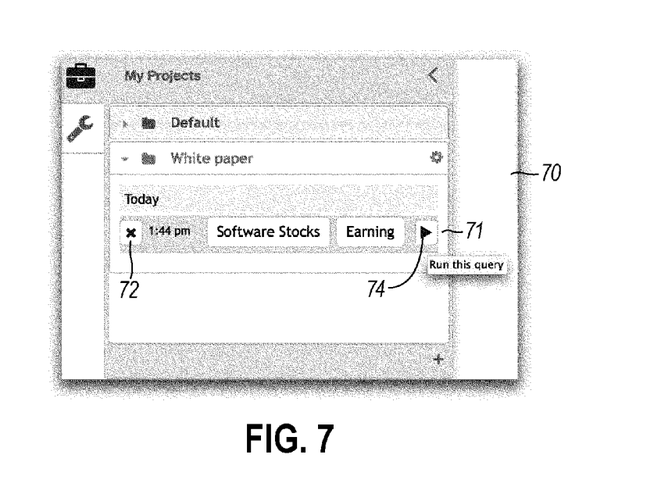
FIG. 7 shows a query saved for later retrieval.

Referring now to FIG. 7, all queries run by a searcher are stored, each query including the keywords, keyword groups, and corresponding weights. These past queries are accessible in a 'Search History' window 70. The searcher can select a given query, iconically represented as seen at 71, to see the date or time of the query, and the query keywords and weights that are stored. If the searcher formed the query with the refinement process, then the number of files ranked is shown with a star.

Queries run against a common set of sources in a single session are grouped together and may be given a project name such as "White Paper" 73. A project is thus a collection of one or more search queries applied to particular data sources. The user is able to customize the name project that appears in window 70, and is also able to provide a description to accompany the project name. In addition, the project may be marked to be shared with other users, allowing searchers to work collaboratively on the project and benefit from the work of other searchers.

When working with a project in the history, the searcher is able to delete a query using a control 72, or the searcher may re-run a query from the history using a control 74, or modify a query by clicking on individual keyword groups presented in the history, and then re-run it.

Figure 8:
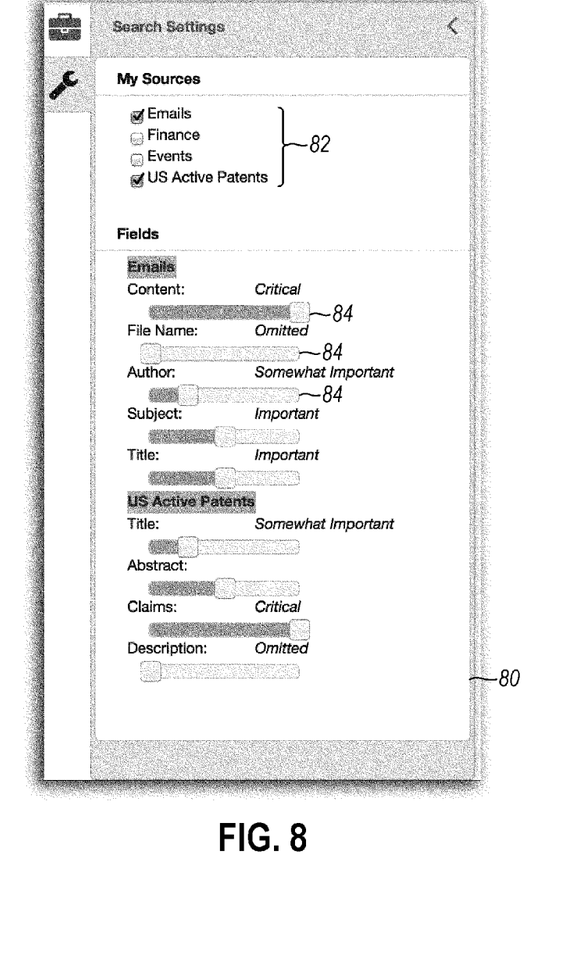
FIG. 8 shows the defined fields of documents from several sources, and the prioritization of the fields of those documents.

Referring now to FIG. 8, the selection of data sources can be explained. A data source (identified herein as a "source") is a collection of related documents available for searching by the searcher. Documents themselves can be organized and structured in various ways. For example, patents are organized by title, abstract, claims and description. Other documents have a title, summary, text, conclusion, and other components. The present invention allows the searcher to select the sources for a search in a settings window 80. Sources for a search are selected using controls such checkboxes 82, which designate the sources to be searched by the queries the searcher creates.

Settings window 80 further permits the searcher to direct the keyword search to identified sections within the documents from each source. Specifically, the search specifies the importance of each document section, using controls 84 specific to each source. These controls can take any form, as is the case with the importance controls for keywords discussed above, but in the illustrated embodiment the controls are in the form of a slider bar adjustable between a far left setting in which the specific section is omitted from the keyword search, and a far right setting in which the specific location is critical to the keyword search and thus the keywords must be included in that section for a document to be reported as a result. As an example of the use of these controls, the searcher may only want to search within the abstract or title of documents, and these controls allow the searcher to define section (s) of the document that are important or critical to the search.

It will be appreciated that a novel and inventive search method, and novel applications therefor, have been described here. Applicant does not intend by this description and the details thereof to limit the scope of the invention being sought to be protected, but rather, that protection is to be defined by reference to the following claims. For example, the specific disclosure herein shows a visual method for specifying relative importance settings for keywords, but the claims are not so limited; relative importance settings may be specified programmatically to the search method, and the method may be implemented by an application service that does not visually present the relative importance settings.

What is claimed is:

1. A method of forming a keyword based search query, comprising:
    receiving a plurality of search keywords that comprise the query from a searcher, each search keyword representing a keyword group;
    for each keyword group, visually presenting a user interface in response to a selection of the keyword group, the user interface including:
        a list of a plurality of purpose-related keywords belonging to the keyword group,
        a plurality of suggested keywords derived from one or more of the purpose-related keywords in the keyword group, each of the suggested keywords selectable by the searcher to add to the list of purpose-related keywords in the keyword group,
        a field for receiving an entry of a keyword from the searcher to add to the purpose-related keywords in the keyword group, and
        for each purpose-related keyword in the keyword group, a searcher weight control for assigning a weight to the purpose-related keyword, each weight representing a searcher-defined relative importance setting for the purpose-related keyword;
    for each keyword group, receiving from the searcher via the user interface an assignment of a weight to at least one purpose-related keyword in the keyword group from a searcher weight control associated with the at least one purpose-related keyword, the assigned weight identifying a relative importance of the at least one purpose-related keyword relative to at least one other purpose-related keyword in the keyword group;
    receiving from the searcher via the user interface a group importance weight for each keyword group of the plurality of the keyword groups;
    performing the keyword based search using the purpose-related keywords in the keyword groups of the query;
    removing a keyword from a keyword group in response to an indication received from the searcher;
        generating a score for each of a plurality of results of the search, the score based on the weight of each purpose-related keyword in the plurality of keyword groups and the group importance weight for each of the keyword groups; and
    sorting the results using the score for each result.

2. The method of claim 1 wherein a purpose-related keyword weight of 0 means the keyword is ignored in the keyword based search.

3. The method of claim 1 wherein the user interface includes at least one single control for assigning a weight to multiple purpose-related keywords in a keyword group.

4. The method of claim 1 wherein the weight of each purpose-related keyword is assigned an initial default value that can be changed by the searcher weight control for the keyword.

5. The method of claim 1 wherein the searcher interface further includes a critical control for each keyword group to mark the keyword group as critical, which indicates that each search result must contain at least one of the purpose-related keywords in the keyword group if the keyword group is marked as critical.

6. The method of claim 1 wherein the searcher interface includes a keyword group importance weight control that is a slider control graphically representing and permitting adjustment of the relative importance setting of the keyword group importance.

7. The method of claim 1 wherein the ordering of the keyword groups does not affect the search results.

8. The method of claim 1 wherein the searcher weight control is a bar graph graphically representing and permitting adjustment of the relative importance setting.

9. The method of claim 1 wherein the searcher weight control is a color wheel graphically representing and permitting adjustment of the relative importance setting.

10. The method of claim 1 wherein the searcher weight control is a numeric selection from numeric range representing and permitting adjustment of the relative importance setting.

11. The method of claim 1 wherein the searcher weight control is a text entry control permitting text entry of the relative importance setting.

12. The method of claim 1 further comprising generating search results, wherein, all else equal, the presence in a result of a keyword with a higher relative importance setting yields a higher ranking of the result in the search results than the presence in the result of a keyword with a lower relative importance setting.

13. The method of claim 1 wherein the group is associated with a group importance control that visually presents the relative importance weight of the group relative to other groups.

14. The method of claim 1 wherein a searcher designates one or more documents describing a concept of interest, and the designated documents are used to develop at least some of the purpose-related keywords for the query using a word frequency analysis of words in the designated documents.

15. The method of claim 1 wherein a searcher designates a block of text describing a concept of interest, and the designated block of text is used to develop the suggested keywords derived from the keyword, using a word frequency analysis of words in the designated block of text.

16. The method of claim 1 wherein the suggested keywords are related to synonyms of one or more purpose-related keywords in the keyword group.

17. The method of claim 14 wherein the suggested keywords are identified using a thesaurus or other index for identifying keywords that are semantically related to the existing purpose-related keywords.

18. The method of claim 14 wherein the suggested keywords are identified from a previous search in which the suggested keywords were grouped with the existing purpose-related keywords.

19. The method of claim 18 in which the previous search was performed by the searcher forming the query with the existing purpose-related keywords.

20. The method of claim 1 wherein suggested keywords related to the existing purpose-related keywords are automatically included in the search query.

21. The method of claim 20 wherein the suggested keywords are identified using a thesaurus or other index for identifying suggested keywords that are semantically related to the existing purpose-related keywords.

22. The method of claim 20 wherein the suggested keywords are identified from a previous search in which the suggested keywords were grouped with the existing purpose-related keywords.

23. The method of claim 22 in which the previous search was performed by the searcher forming the query with the existing purpose-related keywords.

24. The method of claim 1 wherein the searcher designates the importance of fields of documents to be searched, and the designated importance of the field in which a document includes matches to a keyword in the query is used in identifying the relevance of the document to the query.

25. The method of claim 1 wherein a query developed according to the method is saved and later retrieved and re-executed.

26. The method of claim 1 wherein a query developed according to the method is delivered through an application service provider interface to a search engine at a remote location to generate query results.

27. A system comprising:
a first graphical user interface (GUI) configured for:
  receiving query from a user, the query comprising a plurality of search keywords, each representing a keyword group,
  receiving a selection of a keyword group for editing, and
  receiving a keyword group importance setting;
a second GUI configured for editing a selected keyword group, the second graphical user interface comprising:
  a keyword field comprising a list of a plurality of purpose-related keywords belonging to the keyword group;
  a suggested keyword field for displaying a plurality of suggested keywords derived from the purpose-related keywords in the keyword field, the second GUI further configured to:
    receive a selection of one or more of the suggested keywords,
    add the one or more selected keywords to the keyword field, and
    update the suggested keyword field based on the selected keywords added to the keyword field;
  a keyword input field for receiving an entry of a keyword from the user, the second GUI further configured to:
    add the received keyword entry to the keyword field, and
    update the suggested keyword field based on the selected keywords added to the keyword field;
  a keyword removal control to remove a purpose-related keyword from the group; and
  a weight control field for displaying a user weight control associated with each purpose-related keyword in the keyword field, the second GUI further configured to:
    receive a weight from each user weight control, and
    assign the received weight to the associated purpose-related keyword, each received weight representing a searcher-defined relative importance setting for the purpose-related keyword; and
a search engine configured to:
  perform a keyword based search using the plurality of keyword groups in the query and purpose-related keywords in the plurality of keyword groups;
  calculate a score for each of a plurality of search results, the score based on the weight of each purpose-related keyword in the plurality of keyword groups and the group importance setting for each of the keyword groups; and
  sort the results using the score for each result.

* * * * *